(12) United States Patent
Han et al.

(10) Patent No.: US 11,687,274 B2
(45) Date of Patent: Jun. 27, 2023

(54) UNINTERRUPTED DATA FLUSHING IN STORAGE SYSTEMS

(71) Applicant: Dell Products L.P., Round Rock, TX (US)

(72) Inventors: Geng Han, Beijing (CN); Vladimir Shveidel, Pardes-Hana (IL); Yousheng Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/513,126

(22) Filed: Oct. 28, 2021

(65) Prior Publication Data

US 2023/0134128 A1 May 4, 2023

(51) Int. Cl.
*G06F 12/02* (2006.01)
*G06F 12/06* (2006.01)
*G06F 3/06* (2006.01)

(52) U.S. Cl.
CPC ............ *G06F 3/0655* (2013.01); *G06F 3/061* (2013.01); *G06F 3/067* (2013.01)

(58) Field of Classification Search
CPC .. G06F 3/0308; G06F 3/0346; G06F 3/03542; G06F 3/038; G06F 3/048
See application file for complete search history.

(56) References Cited

U.S. PATENT DOCUMENTS

| | | | |
|---|---|---|---|
| 2011/0047306 A1* | 2/2011 | Dickens | G06F 3/038 710/73 |
| 2012/0105320 A1* | 5/2012 | Yano | G06F 3/038 345/157 |

* cited by examiner

*Primary Examiner* — Yong J Choe
(74) *Attorney, Agent, or Firm* — Krishnendu Gupta; Deepika Bhayana; Derek Lam

(57) ABSTRACT

A method is used for uninterrupted data flushing in a storage system. An input/output (I/O) request is received. A pointer for a filling flushing work set (FWS) is atomically switching. A copy of the pointer for the filling FWS is saved, and the counter associated with a FWS referenced by the saved copy of the pointer is incremented. The saved copy of the pointer and the pointer for the filling FWS are compared, and upon determining that the saved copy of the pointer and the pointer for the filling are FWS equal, the I/O request is committed to a page descriptor ring and the counter associated with the FWS referenced by the saved copy of the pointer is decremented.

12 Claims, 14 Drawing Sheets

UNINTERRUPTED DATA FLUSHING IN STORAGE SYSTEMS

BACKGROUND

Technical Field

This application relates to uninterrupted data flushing in storage systems.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

The storage system may be organized into multiple nodes.

SUMMARY OF THE INVENTION

One aspect of the current technique is a method for uninterrupted data flushing in a storage system. An input/output (I/O) request is received. A pointer for a filling flushing work set (FWS) is atomically switching. A copy of the pointer for the filling FWS is saved, and the counter associated with a FWS referenced by the saved copy of the pointer is incremented. The saved copy of the pointer and the pointer for the filling FWS are compared, and upon determining that the saved copy of the pointer and the pointer for the filling are FWS equal, the I/O request is committed to a page descriptor ring and the counter associated with the FWS referenced by the saved copy of the pointer is decremented.

Another aspect of the current technique is a system, with a processor, for uninterrupted data flushing in a storage system. The processor may be configured to perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
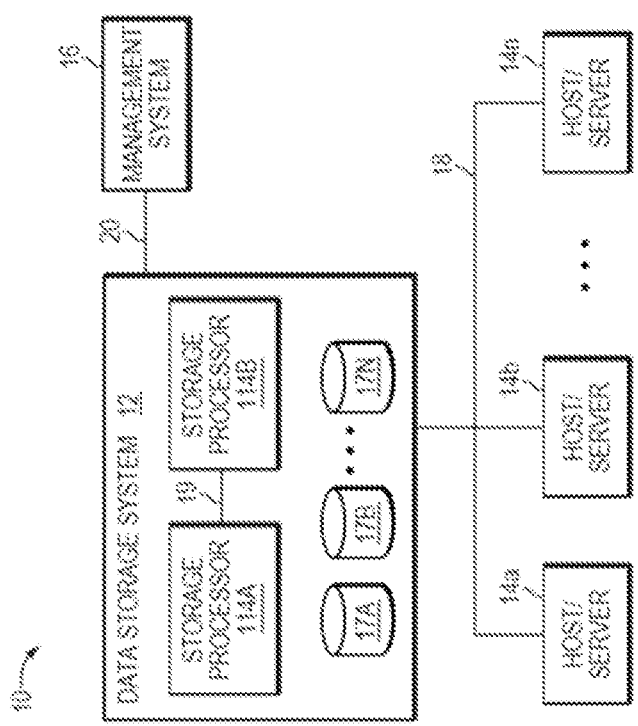
FIG. 1 depicts an example embodiment of a computer system 10 that may be used in connection with performing the techniques described herein.

Described below are techniques for uninterrupted data flushing in a storage system. An input/output (I/O) request is received. A pointer for a filling flushing work set (FWS) is atomically switching. A copy of the pointer for the filling FWS is saved, and the counter associated with a FWS referenced by the saved copy of the pointer is incremented. The saved copy of the pointer and the pointer for the filling FWS are compared, and upon determining that the saved copy of the pointer and the pointer for the filling are FWS equal, the I/O request is committed to a page descriptor ring and the counter associated with the FWS referenced by the saved copy of the pointer is decremented.

A data storage system can use a page descriptor ring to hold data from I/O requests before the data is flushed to storage. In general, the head is a marker that tracks the last entry in the ring that received data, and as new data is added to the ring, the head is incremented accordingly. In many embodiments, the ring is configured such that when the head reaches the end of the ring, the marker is moved to the beginning of the ring.

To manage data being entered into the ring and data being flushed from the ring to storage, data structures known as flushing work sets (FWS) may be used. Each FWS may be associated with a contiguous set of entries in the page descriptor ring. The data storage system may add data to one FWS until the FWS is almost full, at which point, the data storage system switches and begins adding data to the other FWS while flushing data in the previous FWS to storage. With respect to these techniques, the FWS receiving data will be called the "filling FWS" while the FWS whose data is being flushed will be called the "frozen FWS".

Challenges arise when switching the filling FWS from one FWS to the other, and when ensuring that multiple nodes associate the data with the correct FWS. For example, on a single node, I/O requests may still be in-flight when the data storage system determines that the filling FWS is approaching its full capacity and I/O requests should be directed to the other FWS. The data storage system may stop processing incoming I/O requests until the switch has been completed. However, this pause would create a queue of I/O requests and thereby degrade the performance of the storage system. Furthermore, as the storage system switches back and forth between FWSs, I/O requests would exhibit a sinusoidal latency as requests build up in the queue, are processed, and build up again.

Additionally, when a storage system has two nodes, one node recognizes the need to switch FWSs before the other; the node switches its own filling FWS, communicates the switch to the other node, and receives confirmation that the other node has made the switch. There is a delay between the two nodes making the switch, during which both nodes continue receiving I/O requests.

The techniques described herein ensure that the nodes can continue receiving and processing I/O requests when the filling FWS is being switched, both on a single node and across nodes, and that the nodes assign I/O requests to FWSs in a consistent manner. In at least some implementations in accordance with the techniques as described herein, one or more of the following advantages can be provided: improved performance due to uninterrupted processing of I/O requests and maximum effective use of the page descriptor ring.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using Mode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
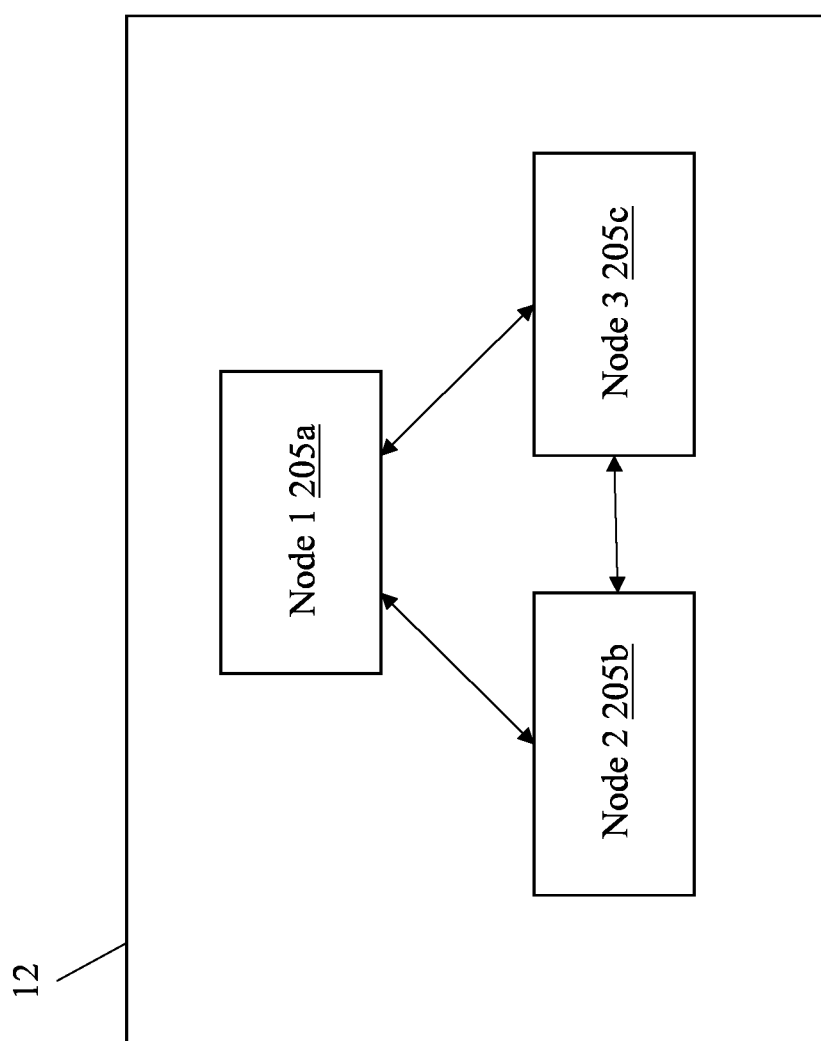
FIG. 2 is a block diagram depicting exemplary nodes among which the elements of the computer system of FIG. 1 may be distributed.

FIG. 2 is a block diagram depicting exemplary nodes 205a, 205b, 205c (individually and collectively, "205") among which the elements of the storage system 12 may be distributed. Although FIG. 2 depicts three nodes 205a, 205b, 205c, various embodiments of the invention may include any number of nodes. The nodes 205 may form a cluster. Each node 205 may receive I/O requests, and communicate with one another to ensure that the data on the nodes 205 are consistent with one another.

Figure 3:
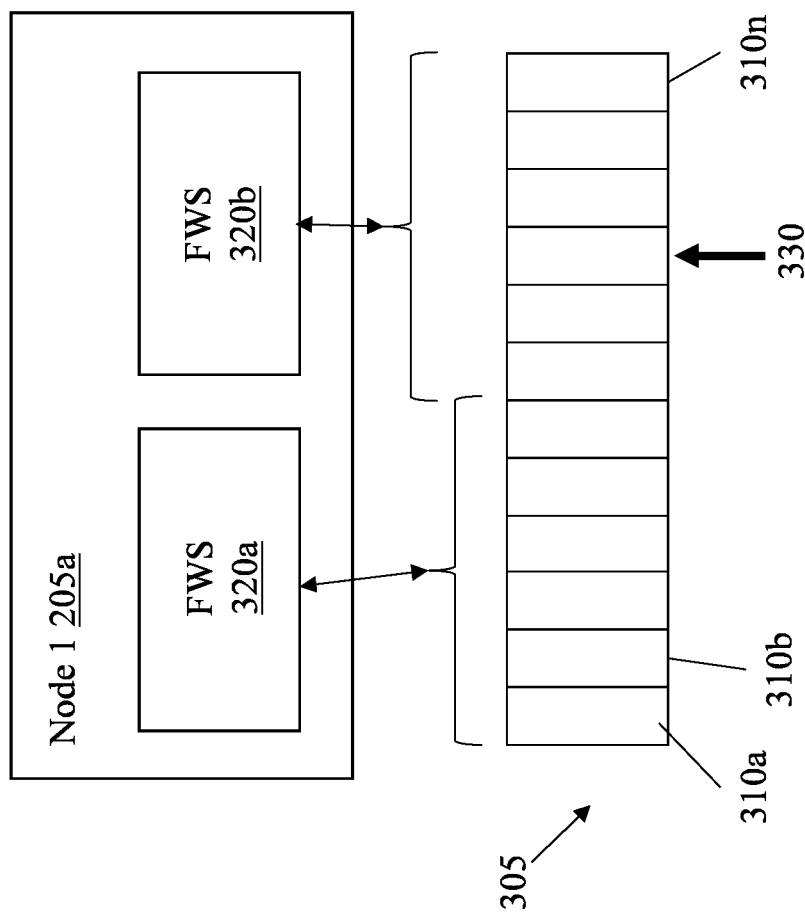
FIG. 3 is an exemplary diagram showing the page descriptor ring and flushing work sets on one node.

FIG. 3 is an exemplary diagram showing the page descriptor ring 305 and FWSs 320a, 320b (individually and collectively, "320") on one node 205a. The page descriptor ring 305 includes multiple entries 310a, 310b, 310n ("310"), each corresponding to a page of data. The head 330 is a marker that points to the next entry 310 available for receiving data. In some embodiments, the head 330 is represented as an offset within the page descriptor 305, or a sequence ID number. When the node 205a receives new data to store, the data is stored in the entry 310 corresponding to the head 330 and the head 330 is advanced to the next entry 310. As shown, each FWS 320 corresponds to a different set of entries 310 in the page ring descriptor 305. When the node 205a determines that the filling FWS 320 should be switched, e.g., from FWS 320a to FWS 320b, the node 205a continues to add data to the ring 305. FWS 320a becomes the frozen FWS 320 whose associated entries in the ring 305 are flushed to storage, while FWS 320b becomes the filling FWS and receives incoming data.

Figure 4:
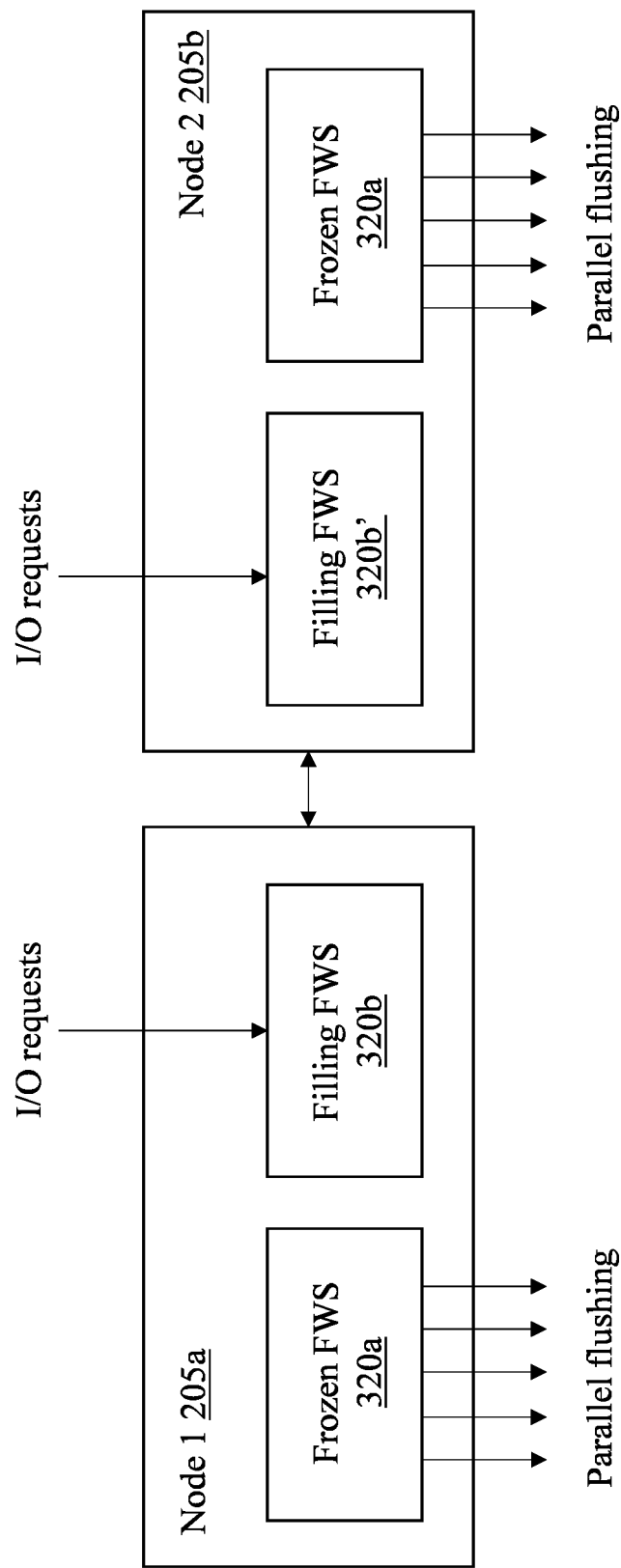
FIG. 4 is a schematic diagram showing the flushing work sets across two nodes.

FIG. 4 is a schematic diagram showing the FWSs 320a, 320b, 320a', 320b' across two nodes 205a, 205b. The FWSs 320, 320' across the nodes 205 mirror one another; the frozen FWSs 320a, 320a' are associated with the same data (i.e., the same entries 310 in the page descriptor ring 305), as are the filling FWSs 320b, 320b'. When the filling FWSs 320b, 320b' are receiving incoming data from I/O requests, both nodes 205a, 205b flush data associated with the frozen FWSs 320a, 320a' to storage.

As previously explained, switching the filling FWS 320 from one FWS 320a to the other 320b poses a number of challenges. When a node 205a determines that the filling FWS 320b is reaching capacity, the node 205a already has I/O requests whose data has not yet been stored in the page descriptor ring 305, and the node 205a will continue to receive I/O requests while the switching is the occurring. One technique would be to identify the last I/O request for the current filling FWS 320b, queue subsequent I/O requests until data for all I/O requests preceding and including the identified I/O request have been added to the page descriptor ring 305, switch the filling FWS from 320b to 320a, and resume servicing I/O requests, beginning with requests in the queue. However, this approach would increase latency periodically whenever the nodes 205a, 205b switch FWSs 320 and thereby degrade performance.

Figure 5:
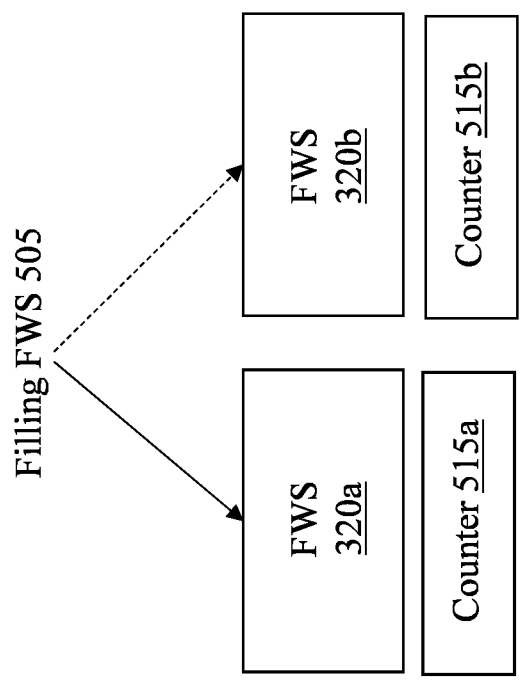
FIG. 5 depicts an exemplary pointer that identifies the flushing work set that is receiving data and counters indicating the number of outstanding I/O requests on the flushing work sets.

An exemplary solution uses a pointer 505 that identifies the FWS 320 serving as the filling FWS 320 and counters 515a, 515b that track the number of I/O requests, for their respective FWSs 320a, 320b, that have not yet been logged in the page descriptor ring 305, as shown in FIG. 5. In this embodiment, the counters 515a, 515b pertain to the I/O requests for the entire FWSs 320, but in other embodiments, an FWS 320 may have multiple counters 515, each associated with a different processor 114 in the data storage system 12.

When a node 205a determines that the filling FWS 320 is nearing its capacity, and/or that the frozen FWS 320 has finished flushing its data to storage, the node 205a may switch FWSs 320 by setting the pointer 505 to the desired FWS 320. After the switch occurs, all subsequent I/O requests are directed to the new filling FWS 320.

Figure 6:
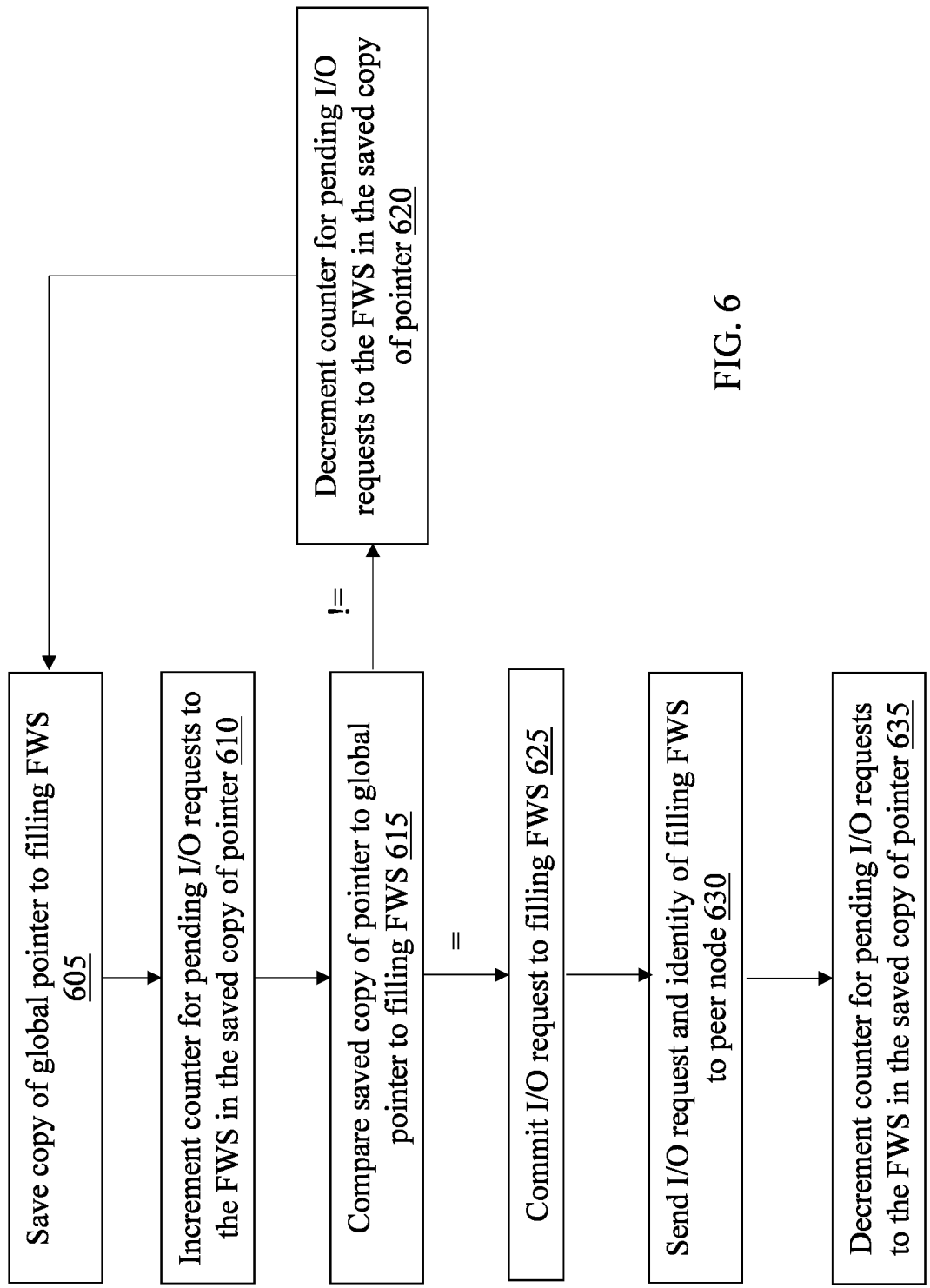
FIG. 6 is an exemplary flow diagram for ensuring data in an I/O request is associated with the filling flushing work set.

FIG. 6 is an exemplary flow diagram 600 for ensuring data in an I/O request is associated with the filling FWS 320. When a node 205 receives an I/O request, the node 205 saves a copy of the pointer 505 to the filling FWS 320 (step 605). The counter 515 for pending I/O requests to the FWS 320 referenced in the copy of the pointer 505 is incremented (step 610). The saved copy of the pointer 505 is then compared to the pointer 505 to the filling FWS 320 (step 615), to determine whether the filling FWS 320 has recently changed. If the pointers are not the same, the I/O request will not be logged to the FWS 320 referenced by the saved copy of the pointer 505, as that FWS 320 has since been frozen. Thus, the counter 515 for the FWS in the saved copy of the pointer 505 is decremented, and control returns to step 605, where a new copy of the pointer 505 to the filling FWS 320 is saved to get the most current identification of the filling FWS 320.

If the saved copy of the pointer 505 matches the pointer 505 for the filling FWS 320 itself, then the I/O request is processed for this filling FWS 320. The I/O request is committed to the filling FWS 320 (step 625), referenced by both the saved copy of the pointer 505 and the pointer 505. Consequently, data for the I/O request is logged in the page descriptor ring 305. To ensure the I/O request is also committed on peer nodes, the node 205 sends the I/O request and the identity of the filling FWS 320 to each peer node (step 630). Because the I/O request has been logged in the page descriptor ring 305, the counter 515 for the FWS 320 in the saved copy of the pointer 505 is decremented (step 635).

To demonstrate this method in more detail, consider an example in which the filling FWS 320 is FWS 320a, and the node 205 switches the filling FWS 320 to FWS 320b. When the node 205a receives an I/O request, the node 205a saves a copy of the pointer 505 to the filling FWS 320. Thus, the node 205a stores a pointer to FWS 320a. To indicate that an I/O request for FWS 320a is in flight, the node 205a increments the counter 515a for FWS 320a. Because the filling FWS 320 may have changed while the counter 515a was being accessed and incremented, the node 205 compares the saved pointer to the pointer 505 for the filling FWS 320.

If the filling FWS 320 has not been switched, then data for the I/O request will be logged for the FWS 320a. The node 205a identifies the head 330 of the page descriptor ring 305, stores the data in the corresponding entry 310, and advances the head 330. Furthermore, to ensure other nodes 205b, 205c remain consistent with the node 205a, the node 205a sends the I/O request to them, while also identifying the FWS 320s that should be associated with the data. In turn, the other nodes 205b, 205c associate the data with the FWS 320a', 320a" corresponding to the FWS 320a of the node 205a. After the other nodes 205b, 205c have confirmed logging of the I/O request, the node 205a decrements the counter 515a for FWS 320a because one of the I/O requests for the FWS 320a has been completed.

However, if the filling FWS 320 has been switched to FWS 320b in the time the counter 515a was being accessed and incremented, the saved pointer to FWS 320a will not match the pointer 505 for the filling FWS 320. Thus, data for the I/O request will not be associated with FWS 320a, and the node 205 decrements the counter 515a for FWS 320a. The node 205 again saves a copy of the pointer 505 to the filling FWS 320, which is now FWS 320b. Because the saved pointer now matches the pointer 505 for the filling FWS 320 (i.e., FWS 320b), the node 205a proceeds to log the I/O request with the FWS 320b. Because the pointer 505 for the filling FWS 320 is checked twice before an I/O request is logged, the techniques described herein prevent an I/O request from being associated with an erroneous FWS 320.

Figure 7:
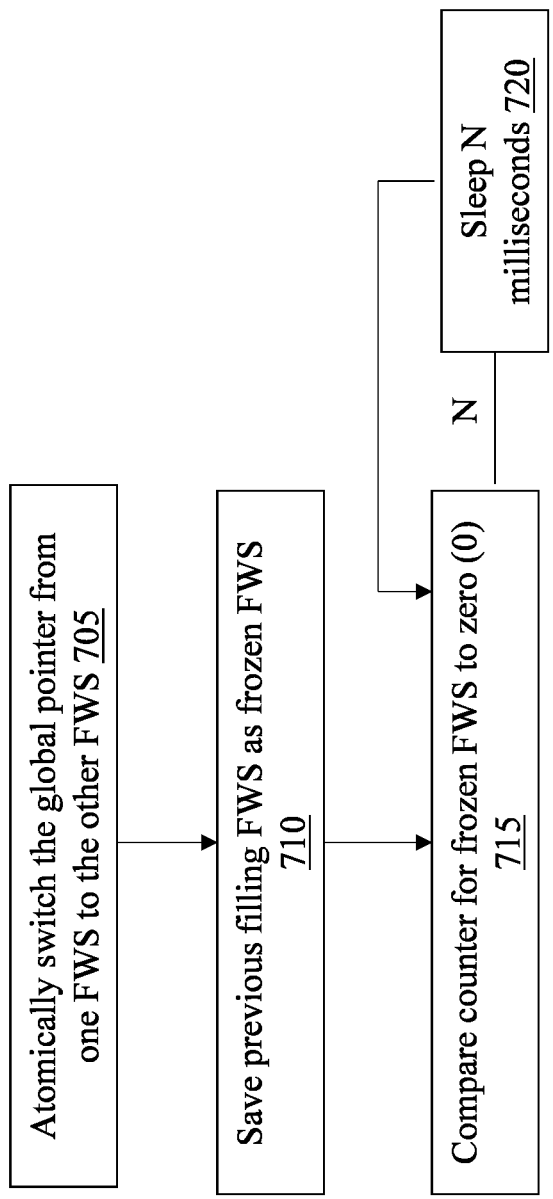
FIG. 7 is an exemplary flow diagram for determining when flushing for a frozen FWS may begin.

FIG. 7 is an exemplary flow diagram 700 for determining when flushing for a frozen FWS 320 may begin (i.e., when all I/O requests for the frozen FWS 320 have been logged in the page descriptor ring 305). When a node 205 determines that the filling FWS 320 is nearing its capacity, and/or the frozen FWS 320 has been flushed, the node 205 atomically switches the pointer 505 for the filling FWS from one FWS 320a to another 320b (step 705). In some embodiments, the node 205 sets the pointer 505, and any I/O requests that have not yet been logged and those that are subsequently received are logged with the FWS 320 newly referenced by the pointer 505.

The previous filling FWS 320 is saved as the frozen FWS 320 (step 710). The counter 515 associated with the frozen FWS 320 indicates the number of I/O requests for the now-frozen FWS 320 that have not yet been logged. Any given I/O request may still be in the process of being committed to the page descriptor ring 305 on the node 205, the ring 305' on other nodes 205, or both. As described above, the counter 515 is decremented each time an I/O request is logged on the node 205 and its peers 205. The counter 515 for the now-frozen FWS 320 may be compared to zero (step 715). If the counter 515 is non-zero, the counter 515 is rechecked after a predetermined interval of time, such as such 100 ms (step 720). In this manner, by monitoring the counter 515, the node 205 can determine when all I/O requests associated with the now-frozen FWS 320 have been logged in the page descriptor ring 305, such that flushing of the frozen FWS 320 can begin.

The filling and frozen FWSs 320 must be consistent across the nodes 205, with respect to both the I/O requests that the nodes 205 receive and the FWS 320 that is being filled at any given time. Because any given I/O request arrives at one node 205 before it is propagated to other nodes 205 and the nodes 205 will receive disparate volumes of I/O requests, one node 205 will need to switch FWSs 320 before the others 205. However, a node 205 cannot begin flushing data from a FWS 320 to storage until all nodes 205 have switched their filling FWSs 320.

Figure 8:
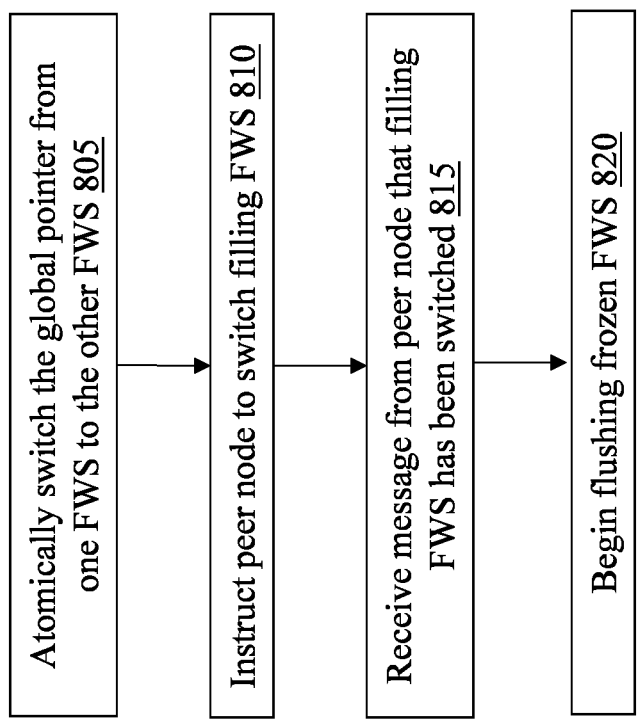
FIG. 8 is an exemplary flow diagram for ensuring all nodes have switched their filling flushing work sets before any given node can begin flushing its frozen flushing work set.

FIG. 8 is an exemplary flow diagram 800 for ensuring all nodes have switched their filling FWSs 320 before any given node 205 can begin flushing its frozen FWS 320. The node 205 that first initiates its switching atomically switches its pointer 505 for the filling FWS 320 to another FWS 320 (step 805). The node 205 instructs its peer node 205 to switch its filling FWS (step 810). The peer node 205 initiate its own switch of FWSs 320, and confirms to the node 205 that its switch has been completed. The requesting node 205 receives a message from the peer node 205 that its filling FWS 320 has been switched (step 815). After the requesting node 205 receives such messages from every other node 205 in the data storage system 12, the requesting node 205 begins flushing data from its frozen FWS 320 to storage (step 820).

Figure 9:
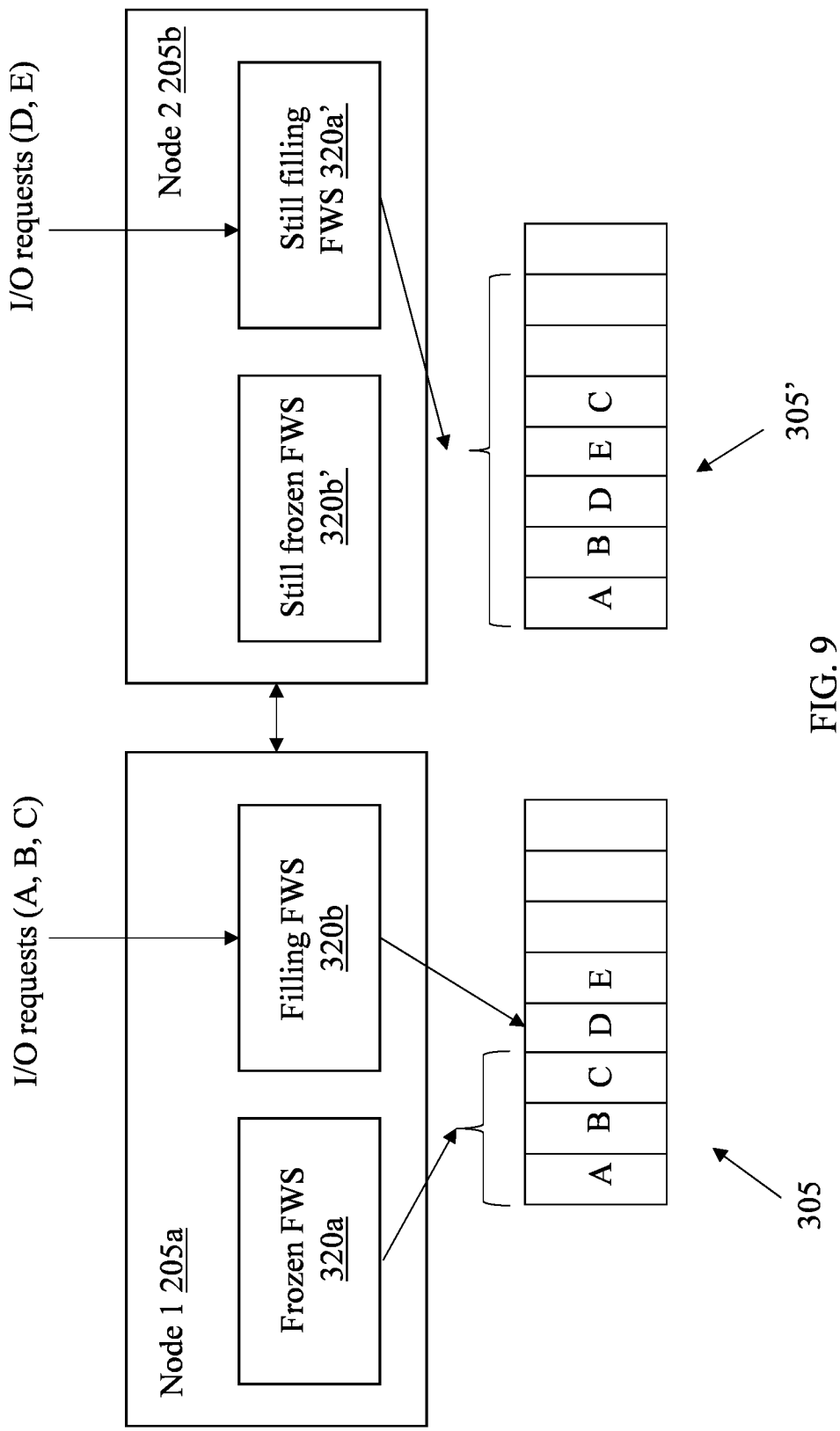
FIG. 9 is an exemplary schematic diagram showing a problematic situation that can arise when a storage system has multiple nodes.

Having multiple nodes 205 poses additional complications. Although nodes 205 coordinate the switching of their filling FWSs 320, the nodes 205 will not switch at exactly the same time. During the delay between one node 205 switching its filling FWS 320 and its peer nodes 205 accomplishing the same objective, the peer nodes 205 continue receiving I/O requests that they would normally continue associating with their current filling FWS 320. In this manner, the peer nodes 205 would log data with a FWS 320 that has already been frozen on another node 205. Furthermore, the data might be logged on page descriptor rings 305 on different nodes 205 in different orders, resulting in a situation such as that depicted in FIG. 9. Moreover, certain I/O requests may have data dependencies such that it would be advantageous for the data to be logged with the same FWS 320 so as to be flushed to storage together. If dependent data is logged to different FWSs 320, data may not be available when it is needed because the storage system 12 must wait for the new filling FWS 320 to fill before it will be frozen and flushed.

Figure 10:
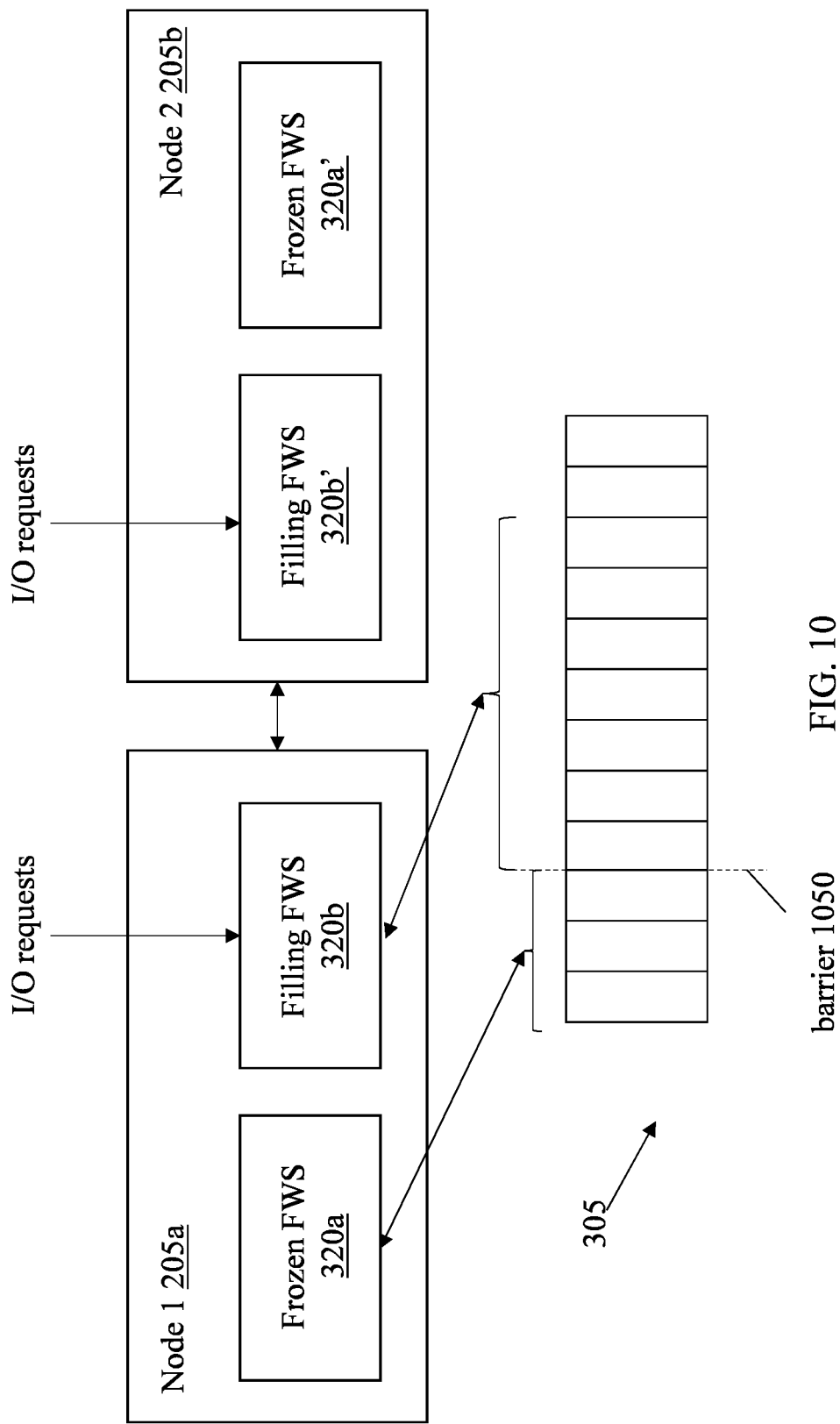
FIG. 10 is an exemplary diagram showing the barrier used for a page descriptor ring in the nodes of the data storage system of FIG. 1.

To remedy these issues, the data storage system 12 uses a barrier 1050 in the page descriptor rings 305 for the nodes 205, as shown in FIG. 10. The barrier 1050 may correspond to a sequence number for the I/O requests. After the barrier 1050 is set, all entries 310 prior to the barrier 1050 in the page descriptor ring 305 will be associated with the frozen FWS 320, whereas entries 310 thereafter will be associated with the filling FWS 320. The nodes 205 communicate with one another regarding the sequence number for I/O requests, the barrier 1050, and FWS 320 to which any given I/O request should be committed.

When a node 205 switches its filling FWS 320, the node 205 sets a barrier 1050 in the page descriptor ring 305 to distinguish data to be associated with the different FWSs 320. The node 205 synchronizes the barrier 1050 with the other nodes 205. In some embodiments, the node 205 negotiates the barrier 1050 with the peer nodes 205. However, barrier setting may happen at any point of I/O committing and thus may not be available during particular steps of any given I/O commit process.

For illustrative purposes, in the following example, the node 205 that initiates switching of the FWS 320 is the primary node 205a, and the peer nodes are secondary nodes 205b, 205c, etc. When the primary node 205a receives an I/O request, the primary node 205a determines whether a barrier 1050 has been set. If no barrier has been set, the primary node 205a increases the counter 515 for the FWS 320a being frozen; otherwise, the counter 515 for the new filling FWS 320b is incremented.

The primary node 205a sends the I/O request and the barrier 1050 to a secondary node 205b to be committed. The secondary node 205b determines the sequence number for the I/O request, and compares this value with the barrier 1050. If the sequence number is lower than the barrier 1050, the secondary node 205b associates the data with the frozen FWS 320a', and if the sequence number is higher, the secondary node 205b selects the filling FWS 320b'. The secondary node 205b commits the I/O request to the selected FWS 320 and confirms the commitment to the primary node 205a. The confirmation may identify the FWS 320 chosen by the secondary node 205b. The primary node 205a then logs the I/O request with the FWS 320 identified by the secondary node 205b, and decrements the counter 515 that it previously incremented.

When the secondary node 205b receives an I/O request, the secondary node 205b sends the I/O request to the primary node 205a to be committed. The primary node 205a determines the sequence number for the I/O request, and compares this value with the barrier 1050 that it has set. If the sequence number is lower than the barrier 1050, the primary node 205 logs the data with the frozen FWS 320a, and if the sequence number is higher, the primary node 205 selects the filling FWS 320b. The primary node 205a commit the I/O request to the selected FWS 320 and confirms the commitment to the secondary node 205b, identifying the FWS 320 to which the secondary node 205b should commit the I/O request. The secondary node 205b then logs the I/O request with the FWS 320 identified by the primary node 205a, and decrements the counter 515 that it previously incremented.

Figure 11:
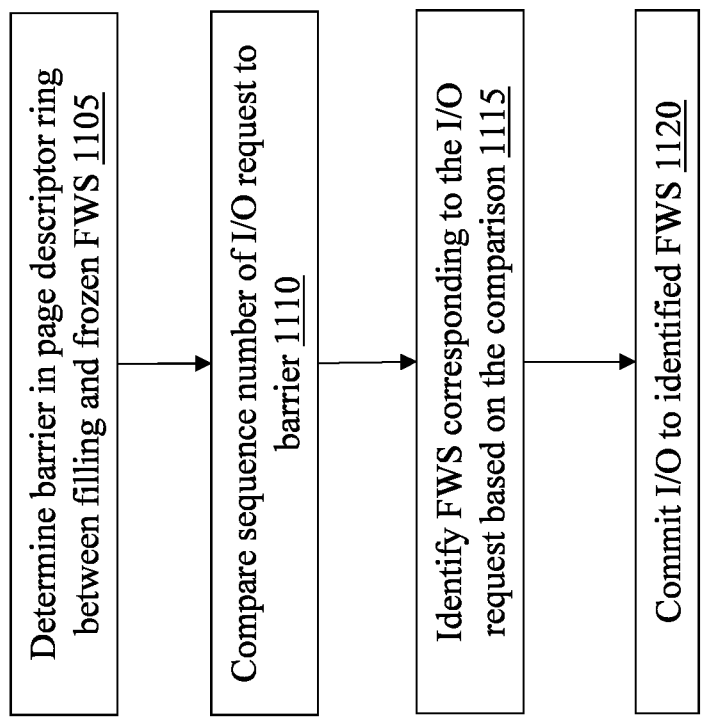
FIGS. 11-13 are exemplary flow diagrams of how nodes coordinate logging of data on the flushing work sets.
Figure 12:
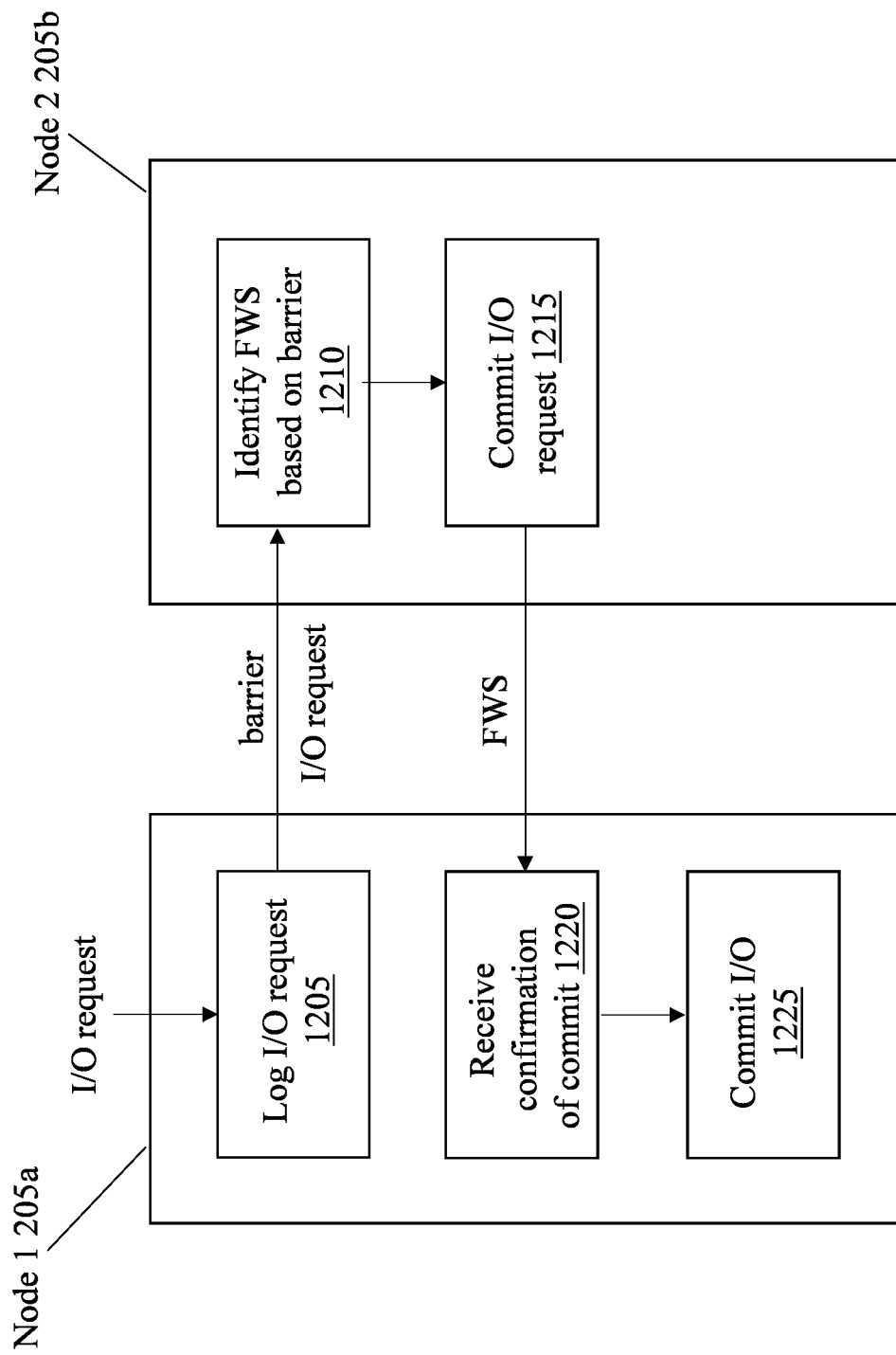
Figure 13:
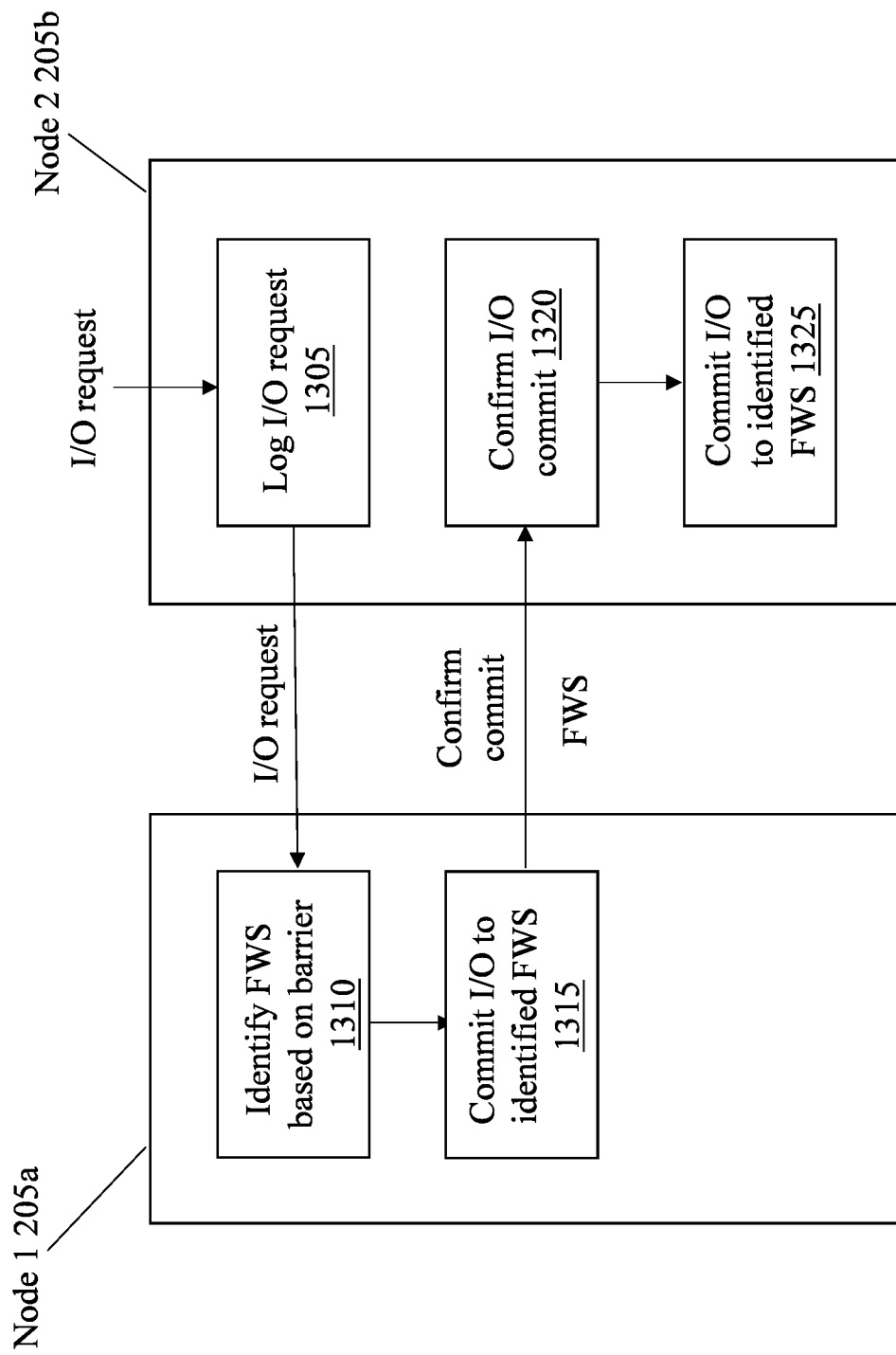

FIGS. 11-13 are exemplary flow diagrams 1100-1300 of how nodes coordinate logging of data on the flushing work sets. With respect to FIG. 11, the data storage system determines the barrier in the page descriptor ring between the filling and frozen FWSs (step 1105). As described above, the primary node 205a may select the barrier, or the primary node 205a may negotiate the barrier with one or more secondary nodes 205b. The sequence number of an I/O request may be compared to the barrier (step 1110). The FWS 320 corresponding to the I/O request may be identified based on the comparison (step 1115). If the sequence number is lower than the barrier, then the I/O request is logged with the frozen FWS 320; otherwise, the I/O request is logged with the filling FWS 320. Then, the I/O request is committed to the identified FWS 320 (step 1120).

With respect to FIG. 12, the primary node 205a receives an I/O request. The primary node 205a logs the request (step 1205) and sends the request and the barrier to the secondary node 205b. The secondary node 205b determines a sequence number for the I/O request. The secondary node 205b identifies the FWS 320 for the I/O request based on the barrier (step 1210). The secondary node 205b commits the I/O request to the identified FWS 320 (step 1215) and confirms the commitment to the primary node 205a. The commitment may identify the FWS associated with the I/O request. The primary node 205a receives confirmation of the commitment (step 1120), and uses the identification of the FWS 320 from the secondary node 205b to commit the I/O request to the identified FWS 320 (step 1225).

Figure 14:
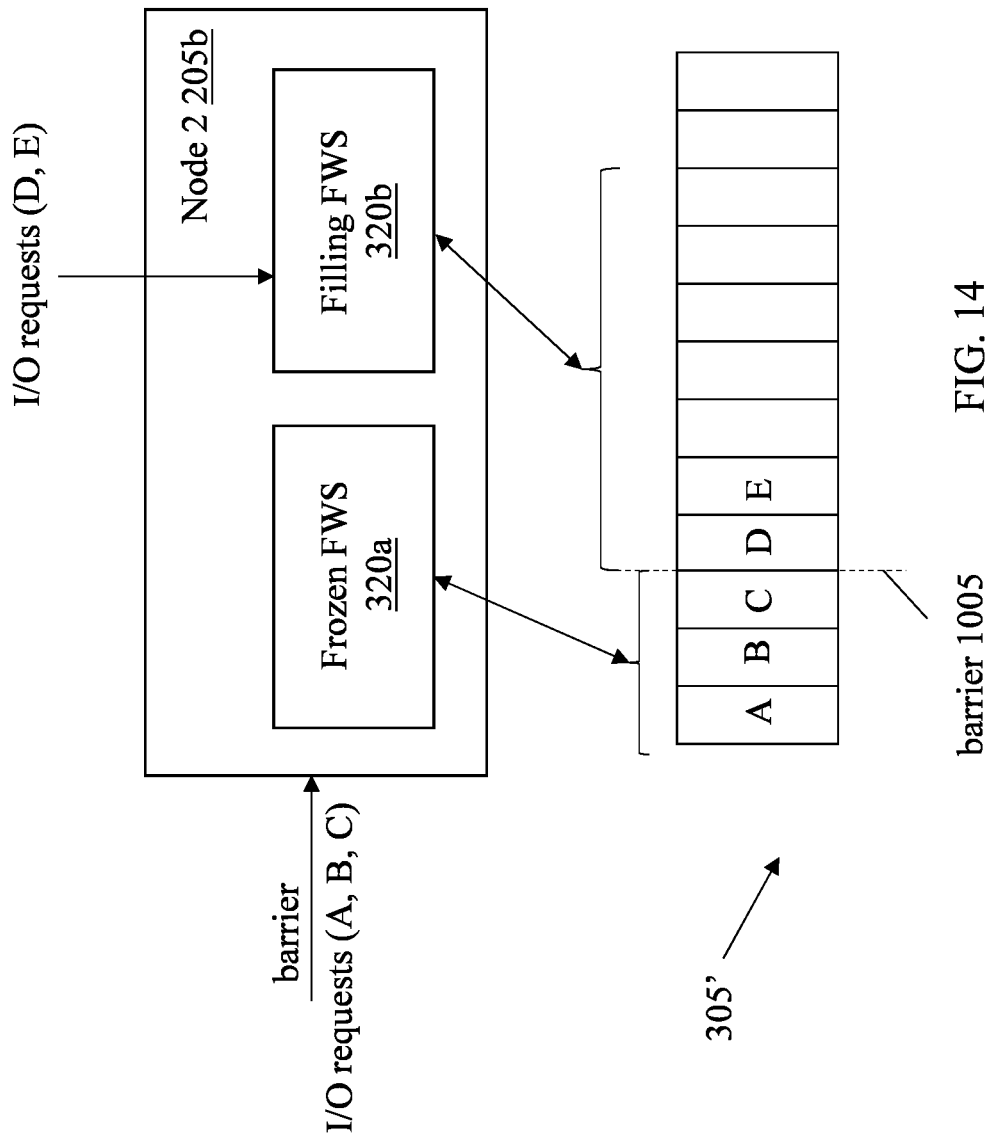
FIG. 14 is an exemplary diagram of the output of a data storage system employing the techniques of FIGS. 9-14.

With respect to FIG. 13, the secondary node 205b receives an I/O request and logs it (step 1305). The secondary node 205b sends the I/O request to the primary node 205a. The primary node 205a determines a sequence number for the I/O request, and compares this number against a barrier to identify the FWS 320 to which the request shall be committed (step 1310). The primary node 205a commits the I/O request to this FWS 320 (step 1315). The primary node 205a confirms the commitment to the secondary node 205b, including the identity of the associated FWS 320. The secondary node 205b receives the confirmation of the commitment and commits the I/O request to the FWS 320 identified by the primary node 205a (step 1325). Using such techniques, primary and secondary nodes 205a, 205b may achieve consistent associations between data and FWSs 320, as depicted in FIG. 14.

In some situations, one node 205 may go offline and need to reboot. When the node 205 reboots, the node 205 may communicate with a surviving node regarding the contents of its FWSs 320. The rebooting node 205 may obtain the barrier from the surviving node 205 and use this barrier to reconstruct the FWSs 320. The rebooting node 205 may compare the sequence ID numbers of the I/O requests it obtains from the surviving node 205 to the barrier, and sort the I/O requests between the FWSs 320 accordingly.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for uninterrupted data flushing in a storage system, the method comprising:
  receiving an input/output (I/O) request;
  atomically switching a pointer for a filling flushing work set (FWS);
  saving a copy of the pointer for the filling FWS;
  incrementing a counter associated with a FWS referenced by the saved copy of the pointer;
  comparing the saved copy of the pointer and the pointer for the filling FWS; and
  upon determining that the saved copy of the pointer and the pointer for the filling FWS are equal, committing the I/O request to a page descriptor ring and decrementing the counter associated with the FWS referenced by the saved copy of the pointer.

2. The method of claim 1, further comprising:
  upon determining that the saved copy of the pointer and the pointer for the filling FWS are not equal,
    decrementing the counter associated with the FWS referenced by the saved copy of the pointer; and
    repeating the steps of saving the copy of the pointer for the filling FWS, incrementing the counter associated with the FWS referenced by the saved copy of the pointer, and comparing the saved copy of the pointer and the pointer for the filling FWS until the saved copy of the pointer and the pointer for the filling FWS are FWS are equal.

3. The method of claim 1, further comprising:
  sending the I/O request and an identification of the filling FWS to a peer node for commitment.

4. The method of claim 1, further comprising:
  monitoring the counter associated with the FWS referenced by the saved copy of the pointer until the counter reaches zero (0); and
  when the counter reaches zero (0), flushing data from the FWS referenced by the saved copy of the pointer.

5. The method of claim 4, further comprising:
  sending an instruction to another node to switch the filling FWS.

6. The method of claim 5, further comprising:
  upon confirmation from the other node that its filling FWS has been switched and the counter reaching zero (0), flushing data from the FWS referenced by the saved copy of the pointer.

7. A system for uninterrupted data flushing in a storage system, the system including a processor configured to:
  receive an input/output (I/O) request;
  atomically switch a pointer for a filling flushing work set (FWS);
  save a copy of the pointer for the filling FWS;
  increment a counter associated with a FWS referenced by the saved copy of the pointer;
  compare the saved copy of the pointer and the pointer for the filling FWS; and
  upon determining that the saved copy of the pointer and the pointer for the filling FWS are equal, commit the I/O request to a page descriptor ring and decrementing the counter associated with the FWS referenced by the saved copy of the pointer.

8. The system of claim 7, wherein the processor is further configured to:
    upon determining that the saved copy of the pointer and the pointer for the filling FWS are not equal,
        decrement the counter associated with the FWS referenced by the saved copy of the pointer; and
        repeat the steps of saving the copy of the pointer for the filling FWS, incrementing the counter associated with the FWS referenced by the saved copy of the pointer, and comparing the saved copy of the pointer and the pointer for the filling FWS until the saved copy of the pointer and the pointer for the filling FWS are equal.

9. The system of claim 7, wherein the processor is further configured to:
    send the I/O request and an identification of the filling FWS to a peer node for commitment.

10. The system of claim 7, wherein the processor is further configured to:
    monitor the counter associated with the FWS referenced by the saved copy of the pointer until the counter reaches zero (0); and
    when the counter reaches zero (0), flush data from the FWS referenced by the saved copy of the pointer.

11. The system of claim 10, wherein the processor is further configured to:
    send an instruction to another node to switch the filling FWS.

12. The system of claim 11, wherein the processor is further configured to:
    upon confirmation from the other node that its filling FWS has been switched and the counter reaching zero (0), flush data from the FWS referenced by the saved copy of the pointer.

* * * * *